S. W. H. WARD.
Carriage Wheel.
No. 85,259.                          Patented Dec. 22, 1868.
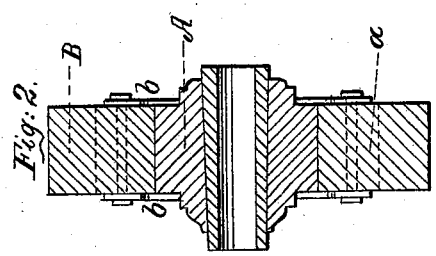
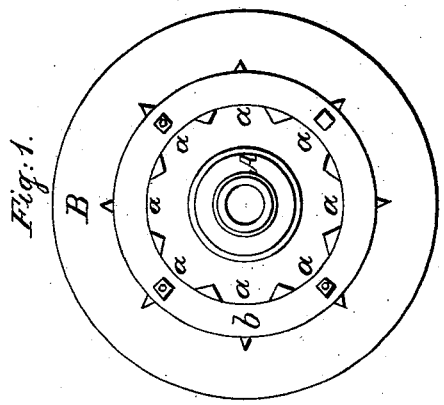

S. W. H. WARD, OF NEW YORK, N. Y.

Letters Patent No. 85,259, dated December 22, 1868.

IMPROVED CARRIAGE-WHEEL.

The Schedule referred to in these Letters Patent and making part of the same.

*To all whom it may concern:*

Be it known that I, S. W. H. WARD, of the city, county, and State of New York, have invented a new and useful Improvement in Wheels for Carriages, &c.; and I do hereby declare the following to be a full, clear, and exact description thereof, which will enable those skilled in the art to make and use the same, reference being had to the accompanying drawing, forming part of this specification, in which drawing—

Figure 1 is a side view of my improved wheel.

Figure 2 is a section in a plane passing through the centre of the hub.

Similar letters indicate corresponding parts.

This invention relates to a wheel, composed of a hub, of wood, or metal, or other hard material, and a rim, of India rubber, in such a manner that a wheel is obtained which will run easily and noiselessly over obstructions; and The invention consists in forming the hub with projections on its periphery, which enter corresponding recesses in the rubber rim, and prevent said rim from slipping around on the hub, the lateral movement of the rim being prevented by metallic plates secured to the hub, as hereinafter more fully described.

A represents the hub of my wheel, which is made of metal, wood, or any other suitable hard material.

This hub is formed with projections, *a*, on its periphery.

The body or rim, B, of the wheel, is made of rubber, and is formed with recesses of corresponding shape and size, to receive the projections *a*. By this means the rim is kept from slipping around on the hub.

The lateral movement of the rim is prevented by metallic plates, *b*, secured to the faces of the wheel by bolts, screws, or rivets, passing into or through the hub.

By preference, I construct the hub, with its projections, of metal, and the rim of soft rubber, but slightly if at all vulcanized.

By these means a wheel is obtained which, when it meets an obstruction, passes readily over the same, and which is applicable to carriages or vehicles of every description.

I am aware that it is not new to construct a wheel of a hub of wood or metal and a rim of rubber; therefore I do not claim such construction broadly; but having thus described my invention,

What I claim as new, and desire to secure by Letters Patent, is—

A carriage-wheel, consisting of a rim, B, of rubber, fitted on a hub, A, having projections, *a*, to prevent the rim slipping around, the lateral movement of the rim being prevented by metallic plates *b*, secured to the hub, in the manner herein described.

S. W. H. WARD.

Witnesses:
W. HAUFF,
ERNEST F. KASTENHUBER.